United States Patent [19]

Sung et al.

[11] Patent Number: 5,357,908
[45] Date of Patent: Oct. 25, 1994

[54] FUEL MODIFICATION METHOD AND APPARATUS FOR REDUCTION OF POLLUTANTS EMITTED FROM INTERNAL COMBUSTION ENGINES

[75] Inventors: Shiang Sung, New York, N.Y.; John J. Steger, Pittstown, N.J.; Joseph C. Dettling, Howell, N.J.; Patrick L. Burk, Freehold, N.J.

[73] Assignee: Engelhard Corporation, Iselin, N.J.

[21] Appl. No.: 49,098

[22] Filed: Apr. 16, 1993

[51] Int. Cl.⁵ ............................................. F02B 43/08
[52] U.S. Cl. ................................... 123/3; 123/179.8; 123/576; 123/578
[58] Field of Search ................. 123/3, 575, 576, 578, 123/179.8

[56] References Cited

U.S. PATENT DOCUMENTS

| | | |
|---|---|---|
| 1,202,610 | 10/1916 | Thornhill et al. . |
| 1,384,512 | 7/1921 | Bochi . |
| 3,783,841 | 1/1974 | Hirschler, Jr. et al. ............ 123/3 |
| 3,794,000 | 2/1974 | Hodgkinson . |
| 3,799,125 | 3/1974 | Hutchinson ...................... 123/578 |
| 3,800,533 | 4/1974 | Zankowski . |
| 3,855,980 | 12/1974 | Weisz et al. . |
| 3,892,218 | 7/1975 | Senger ............................ 123/578 |
| 3,963,013 | 6/1976 | Authement et al. . |
| 3,985,108 | 10/1976 | Matsumoto et al. ............ 123/3 |
| 4,119,061 | 10/1978 | Hoshi et al. .................... 123/3 |
| 4,121,542 | 10/1978 | Frie et al. ....................... 123/3 |
| 4,131,086 | 12/1978 | Noguchi et al. . |
| 4,147,136 | 4/1979 | Noguchi et al. ................ 123/3 |
| 4,349,002 | 9/1982 | Allen . |
| 4,359,863 | 11/1982 | Virk et al. . |
| 4,429,675 | 2/1984 | Talbert . |
| 4,441,477 | 4/1984 | Holt . |
| 4,562,820 | 1/1986 | Jiminez . |
| 4,715,347 | 12/1987 | Hampton et al. . |
| 5,130,099 | 7/1992 | Schatz . |

FOREIGN PATENT DOCUMENTS 2601044 7/1976 Fed. Rep. of Germany .
3002554 7/1981 Fed. Rep. of Germany .

OTHER PUBLICATIONS

Griffiths, John—"Ford Puts Out A Cleaner Cat", Financial Times, Nov. 28, 1991.

Primary Examiner—F. Rollins Cross
Assistant Examiner—Erick Solis

[57] ABSTRACT

A method for controlling exhaust gas emissions from an engine (16) includes extracting a light distillate fuel (Fd) from conventional gasoline or other liquid hydrocarbon fuel and supplying the engine with the light distillate fuel during an initial operation period of the engine. This reduces the oxidizable pollutants in the engine exhaust during a cold-start period before a catalytic converter (22) used to abate pollutants in the engine exhaust gases has not yet attained its operating temperature. After the catalytic converter (22) has been sufficiently heated, the fuel supply to the engine (16) is switched to gasoline or other liquid hydrocarbon fuel. Both the distillate fuel (Fd) and the liquid hydrocarbon fuel may be passed through a heated cracking catalyst bed (30) to crack the fuel fed to the engine.

17 Claims, 1 Drawing Sheet

FUEL MODIFICATION METHOD AND APPARATUS FOR REDUCTION OF POLLUTANTS EMITTED FROM INTERNAL COMBUSTION ENGINES

BACKGROUND OF THE INVENTION

1. Field of the Invention

The present invention is concerned with an apparatus for reducing the emission of pollutants in the exhaust gas of an internal combustion engine by modifying the fuel supplied to the engine at least during a start-up period. More specifically, the present invention is concerned with both fractionation and catalytic treatment of conventional liquid hydrocarbon fuel used for an internal combustion engine.

2. Background and Related Art

Apparatuses and techniques for modifying the fuel fed to an internal combustion engine are known in the art. For example, U.S. Pat. No. 3,794,000 to Hodgkinson, dated Feb. 26, 1974 discloses a fuel system for separating volatile fuel from gasoline. The apparatus used in this system comprises a vaporizing chamber into which gasoline is introduced to provide vapors which are removed by a pump and condensed under pressure to form a liquid which is stored in a storage container disposed within the vaporization chamber. The line from the pressurizing pump to the storage container is extended around the storage container to provide additional heat exchange with the gasoline (column 2, lines 54–55 and column 6, lines 30–31) thereby increasing volatilization of the gasoline. When the engine is started the condensate is used as fuel. When the engine reaches a satisfactory operating temperature, a valve cuts off the flow of the condensate and allows normal gasoline to flow to the carburetor (column 5, lines 13–20). The storage container for the condensate includes a level sensor which, when the level of condensate is low, triggers the pump to draw additional vapors from the vaporization chamber. When the vapor pressure in the vaporization chamber is low, additional gasoline is drawn from the gas tank and sprayed into the vaporization chamber (column 5, lines 35–44). In addition, when the storage tank is full, the switch turns the condensing pump off. After the cold-start period, gasoline from both the gas tank and the volatile-depleted gasoline from the vaporization tank are used to run the engine (column 5, line 65 through column 6, line 15).

U.S. Pat. No. 4,394,002 to Allen, dated Sep. 14, 1982, discloses an apparatus and a method for fractionating the gasoline fuel for an internal combustion engine, and combusting the different fractions in repeating sequence in the engine in order to improve fuel mileage. Heat from the engine is utilized via the engine coolant in the fractionation process.

U.S. Pat. No. 3,855,980 to Weisz et al, dated Dec. 24, 1974 discloses a fuel system for an internal combustion engine in which conventional fuel from a fuel tank is passed through a zeolitic catalytic converter heated by engine exhaust gases before being supplied to the engine. The effect of the catalyst is said to improve the octane content of the fuel fed to the engine.

U.S. Pat. No. 4,429,675 to Talbert, dated Feb. 7, 1984 teaches the separation of conventional liquid fuel (gasoline) into a vapor fraction and a liquid fraction using either ultrasonic energy or the heat in the exhaust gases of the engine. The heavier fraction is used, if at all, only at start-up. Other patents teach generally the use of light fractions of a fuel. See, e.g., U.S. Pats. Nos. 1,202,610; 1,384,512; 4,441,477; 3,800,533; 4,562,820; 3,963,013 and German Patent document DE 3002-544, dated Jul. 31, 1981.

SUMMARY OF THE INVENTION

The present invention provides a method for abating pollutants discharged from an internal combustion engine fueled by a liquid hydrocarbon fuel, at least during the cold-start period of operation, by extracting low boiling point fraction of the liquid hydrocarbon fuel, and supplying the low boiling point fraction to the engine during start-up. Specifically, the method comprises (a) heating the liquid hydrocarbon fuel to vaporize therefrom a low boiling point fraction, condensing the low boiling point fraction to obtain therefrom a distillate fuel, and storing the distillate fuel in a storage container; (b) supplying the distillate fuel to the engine as part of a start-up fuel/air combustion mixture for engine start-up and during an initial engine operating period; and (c) after the initial engine operating period, terminating the supply of distillate fuel to the engine and supplying the liquid hydrocarbon fuel of (a) to the engine as part of a second fuel/air combustion mixture for a subsequent engine operating period. The method further comprises (d) refining at least one of the distillate fuel and the liquid hydrocarbon fuel by contacting it under cracking or isomerizing conditions with a cracking catalyst prior to supplying the fuel to the engine, and (e) regenerating the cracking catalyst during operation of the engine by by-passing the supply of distillate fuel or liquid hydrocarbon fuel to the engine around the cracking catalyst, and flowing air through the cracking catalyst under catalyst regeneration conditions.

According to one aspect of the invention, one or both of refining of step (d) and regenerating of step (e) may comprise heating the cracking catalyst, which may be accomplished using heat generated by operation of the engine and/or electrical power that may be generated by the vehicle or that may come from a battery.

The method may further comprise carrying out step (a) by heating the liquid hydrocarbon fuel with heat generated by operation of the engine. The use of heat generated by the engine for this purpose or for steps (d) and (e) as stated above may be accomplished by transferring heat from either or both of the engine exhaust gas and the engine coolant fluid to the liquid hydrocarbon fuel. Alternatively, the heating in step (a) may optionally be replaced by a step which separates a low boiling point fraction from the liquid hydrocarbon fuel prior to condensing the low boiling point fraction.

In a further aspect of this invention, when the exhaust gas is flowed through a heat exchanger in the gas tank to heat the liquid hydrocarbon fuel, the exhaust gas is preferably treated by the removal of pollutants such as unburned hydrocarbons, carbon monoxide or nitrogen oxides by contacting the exhaust gas under abatement conditions with an exhaust gas purification catalyst, before flowing the exhaust gas into the heat exchanger.

Still another aspect of the invention comprises that the step of condensing the low boiling point fraction may comprise passing the low boiling point fraction in heat exchange relation with a heat exchanger utilizing coolant from an air conditioning system powered by the vehicle. Alternatively, the condensing step may comprise increasing the pressure in the storage container, e.g., by introducing pressurized air into the storage container.

According to another aspect of the application, the method may comprise measuring the temperature of the liquid hydrocarbon fuel and ceasing the supply of heat thereto when the temperature reaches a predetermined level. In addition, or as an alternative, the method may comprises measuring the quantity of liquid hydrocarbon fuel in the fuel tank and ceasing the supply of heat thereto when the quantity falls to a predetermined level.

In another aspect, the present invention provides an improvement in an internal combustion engine system comprising an internal combustion engine, a fuel tank for storing a liquid hydrocarbon fuel, and a liquid fuel transfer means including a fuel pump and a fuel line connecting the fuel tank in liquid flow communication with the engine for transferring the liquid fuel from the fuel tank to the engine, and an exhaust gas discharge pipe connected to the engine for discharge of exhaust gas from the engine. The improvement comprises liquid fuel heating means disposed within the fuel tank to vaporize a low boiling point fraction from the liquid hydrocarbon fuel, and a vapor line connecting the fuel tank in vapor flow communication with a condenser zone for condensing the low boiling point fraction into a liquid distillate fuel. The improvement further comprises a distillate fuel storage container connected in liquid flow communication with the condenser zone, and a distillate fuel line connecting the distillate fuel storage container in liquid flow communication with the fuel line. A distillate fuel control valve may be disposed in the distillate fuel line to control the flow of distillate fuel therethrough. A liquid fuel control valve is disposed in the fuel line to selectively control the flow of fuel through the fuel line from the fuel tank or the distillate fuel line. There may also be a control means responsive to start-up of the engine and operationally connected to both the liquid fuel control valve and the distillate fuel control valve, to open the distillate fuel valve and operate the liquid fuel control valve to permit the flow of liquid distillate fuel into the fuel line during an initial engine operating period, and to close the distillate fuel valve and operate the liquid fuel valve to permit the flow of liquid hydrocarbon fuel therethrough at the end of the initial engine operating period. The apparatus may further comprise a cracking catalyst bed disposed in the fuel line for refining fuel flowing therethrough into a more efficiently combustible composition and regeneration means for regenerating the cracking catalyst while the engine is in operation.

According to one aspect of the invention the improvement may further comprise a fuel by-pass line disposed in the fuel line, through which fuel flowing to the engine by-passes the cracking catalyst bed.

In another aspect of the invention, the improvement further comprises an exhaust gas catalytic converter positioned in the exhaust gas pipe in gas flow communication with exhaust gas discharged therethrough to catalyze the conversion of noxious components of the exhaust gas to innocuous components. The liquid fuel heating means may be dimensioned and configured to transfer heat from the effluent of the exhaust gas catalytic converter to the liquid hydrocarbon fuel in the fuel tank.

According to another aspect of the invention, the apparatus may further comprise fuel tank temperature sensing means, and the liquid fuel heating means may be responsive to the temperature sensing means, wherein when the temperature of the liquid hydrocarbon fuel reaches a predetermined level, the liquid fuel heating means stops heating the fuel tank. According to yet another aspect of the invention, the apparatus may comprise a fuel tank level sensing means, and the liquid fuel heating means may be responsive to the level sensing means, wherein when the level of the liquid hydrocarbon fuel falls to a predetermined level, the liquid fuel heating means stops heating the fuel tank.

DETAILED DESCRIPTION OF THE INVENTION AND SPECIFIC PREFERRED EMBODIMENTS THEREOF

Figure 1:
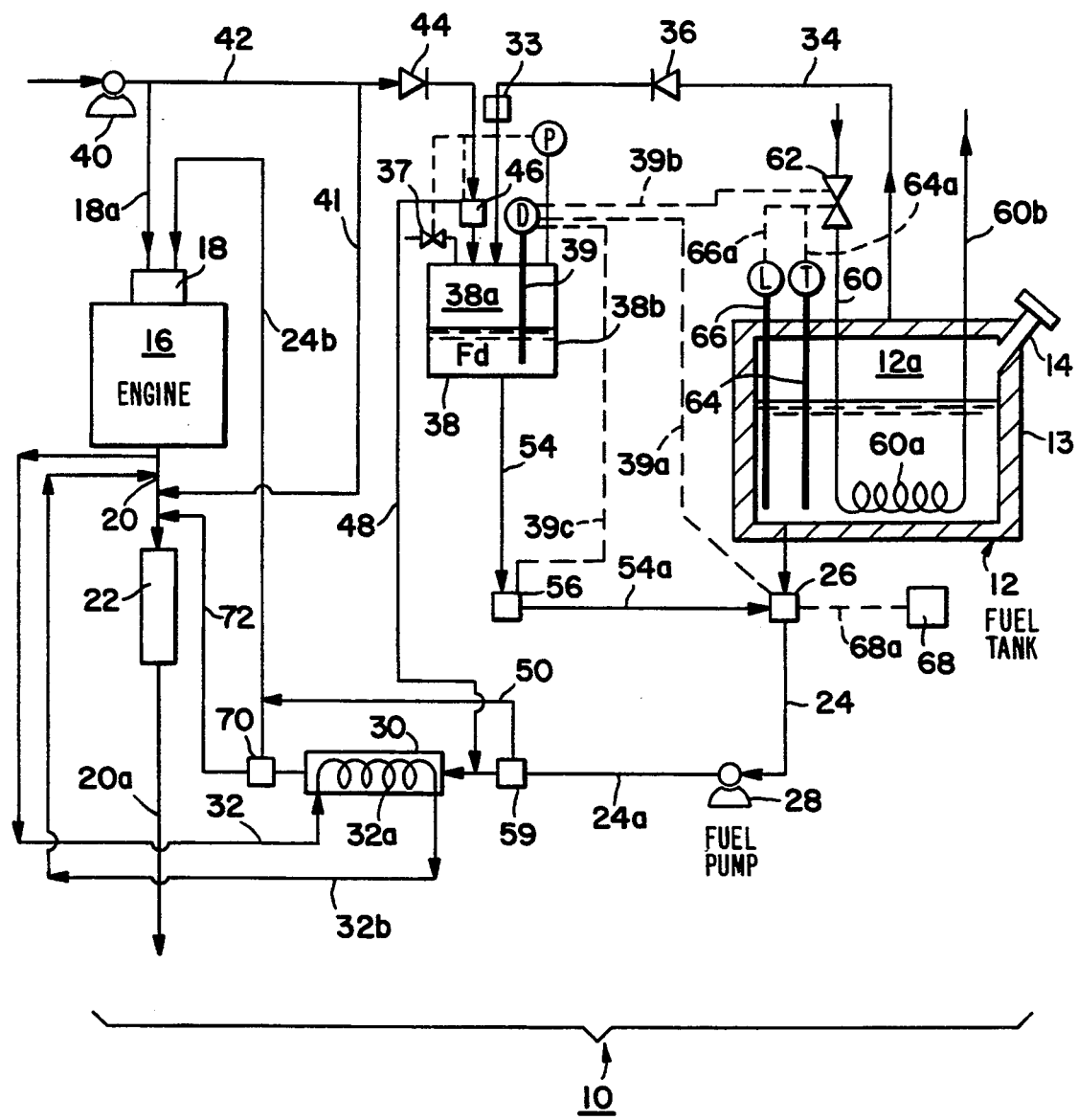
FIG. 1 is a schematic block diagram illustrating one embodiment of an internal combustion engine system according to the present invention.

FIG. 1 schematically illustrates an improved engine system 10 in accordance with an embodiment of the invention. The system includes a fuel tank 12 encased with a layer of thermal insulating material 13 and having a fill pipe 14 fitted with a cap. Fuel tank 12 is connected, as described below, to supply fuel to an internal combustion engine 16 fitted with a carburetor (or fuel injector) 18 having an air inlet 18a. In the illustrated embodiment, engine 16 has an exhaust pipe 20, 20a fitted with a conventional catalytic converter 22 which contains a catalyst for the abatement of pollutants. For example, in the case of a gasoline-fueled engine, catalytic converter 22 may serve to catalyze the conversion of hydrocarbons, carbon monoxide and nitrogen oxides contained in the exhaust gas to $H_2O$, $CO_2$ and $N_2$.

Liquid fuel transfer means is provided by a fuel line 24, 24a, 24b which extends from fuel tank 12 to carburetor 18 and in which is disposed a solenoid-operated valve 26, a fuel pump 28, valve 59, a cracking catalyst bed 30 and a valve 70. Preferably, valve 59 and valve 70 are both solenoid-operated valves. Cracking catalyst bed 30 contains a cracking catalyst, for example, a solid super acid catalyst such as $ZrO_2:SO_4$ which is capable of refining liquid hydrocarbon fuels such as gasoline at room temperature in order to crack heavier molecules to lighter molecules and optionally to isomerize certain molecules to form an improved fuel which is more readily combusted in the engine and which permits leaner operation. Depending on the type of catalyst used and the extent and rate of cracking desired, it may be desirable to heat cracking catalyst bed 30. This may be effectively accomplished by diverting at least a portion of the hot exhaust gas exiting from engine 16 via exhaust pipe 20 into line 32. The hot exhaust gases would then flow through a coil 32a disposed within cracking catalyst bed 30 to heat catalyst bed 30. The exhaust gas is then withdrawn via line 32b to pipe 20 for discharge through catalytic converter 22. In other embodiments, a plate-type heat exchanger may be used in place of coil 32a to heat catalyst bed 30. Alternatively, catalyst bed 30 could be heated by an electrical resistance heater powered from the vehicle battery.

A vapor line 34 connects the vapor space 12a above the gasoline (or other liquid hydrocarbon fuel contained within fuel tank 12) with a condenser 38 which is equipped with a distillate fuel level sensor 39 having associated therewith a sending unit D connected by a first control line 39a to valve 26, by a second control line 39b to valve 62, and also by a third control line 39c to valve 56. Valves 26, 62 and 56 are all preferably solenoid-operated control valves. Vapor line 34 is provided with a check valve 36 to ensure that there is no backflow from condenser 38 to the fuel tank 12. An air pump 40 provides compressed air through line 42 through a check valve 44 and valve 46 which is preferably a solenoid-operated valve, into the vapor space 38a above condensed distillate fuel Fd contained within the distillate fuel storage container 38b provided, in the illustrated embodiment, by the bottom portion of condenser 38. A compressed air by-pass line 48 extends from valve 46 to fuel line 24a, for a purpose to be described below. Air pump 40 may also provide compressed air to carburetor 18 via air inlet 18a. Alternatively, or in addition, air pump 40 may provide compressed air through line 41 to exhaust pipe 20 for entry into catalytic converter 22. Valves (not shown) control the air flow into air inlet 18a and/or exhaust pipe 20.

A fuel line by-pass conduit 50 is connected to valve 59 which is disposed in fuel line 24a at a point upstream of cracking catalyst bed 30 and runs to fuel line 24b at a point downstream of cracking catalyst bed 30, providing a by-pass in the fuel line around catalyst bed 30.

A distillate fuel line 54 leads from the distillate fuel storage container 38b to a solenoid-operated valve 56, from whence distillate fuel line 54a runs to solenoid-operated valve 26. Distillate fuel from storage container 38b can thus be flowed into the liquid fuel transfer means through valve 26, for transfer to carburetor 18 via fuel line 24, fuel pump 28 and fuel line 24a, valve 59 and either through catalyst bed 30 and valve 70 or by-pass conduit 50, and thence via fuel line 24b into carburetor 18. A timer 68 is connected by a control line 68a to valve 26.

Fuel tank 12 is equipped with a heating fluid inlet 60, heating coil 60a and heating fluid outlet 60b. Any suitable heating fluid, e.g., the coolant liquid used to cool internal combustion engine 16, may be used. Thus, in a typical automobile engine, a side stream of heated engine coolant would be passed from the radiator into heating fluid inlet 60 and after passing through coil 60a would be returned to the engine radiator via outlet 60b. However, a plate-type heat exchanger would be preferred over coil 60a. Alternatively, or in addition, a heating fluid other than the engine coolant fluid could be used. The separate heating fluid could be heated by heat exchange with hot exhaust gas discharged from engine 16 or from catalytic converter 22. In still another embodiment, hot and preferably catalytically treated exhaust gas from the engine may be flowed through the heat exchanger to heat the liquid fuel. Heating fluid inlet 60 is equipped with a control valve 62 to control the flow of heating fluid through coil 60a. A temperature probe 64 and fuel level sensor 66 are mounted within fuel tank 12. Temperature probe 64 is equipped with a sending unit T and fuel level sensor 66 is equipped with a sending unit L which emits a signal indicating the quantity of liquid hydrocarbon fuel in the fuel tank. Sending units T and L are connected via control lines 64a and 66a, respectively, to provide control signals to control valve 62.

In operation, distillate fuel level sensor 39, sensing a low level or entire lack of distillate fuel in the distillate fuel storage container 38b, prompts sending unit D to send a signal via control line 39b to cause control valve 62 to open, thereby permitting the flow of a heating fluid through heating fluid inlet 60, heating coil 60a and thence out of fuel tank 12 through heating fluid outlet 60b. Insulation material 13 serves to reduce heat losses from fuel tank 12. As a consequence of heating the gasoline or other liquid hydrocarbon fuel stored in fuel tank 12, a low boiling fraction of hydrocarbons from the liquid hydrocarbon fuel contained within fuel tank 12 is vaporized and passes through vapor line 34, through check valve 36 and heat exchanger 33, and into condenser 38. If the temperature of the gasoline within fuel tank 12 becomes too high, sending unit T of temperature probe 64 sends a signal through control line 64a to close valve 62 to reduce or stop altogether the in-flow of heating fluid. Should the level, i.e., quantity, of fuel in fuel tank 12 become exceedingly low, fuel level sensor 66 emits a signal from its sending unit L through control line 66a to move valve 62 in a closing direction to reduce or eliminate the flow of heating fluid.

Heat exchanger 33 withdraws heat from the vapor flowing in vapor line 34 to promote condensation of the distillate fuel in condenser 38, which then collects in distillate fuel storage container 38b. Heat exchanger 33 may be a plate-type heat exchanger which may utilize coolant from the vehicle air conditioning system. Compressed air may be introduced into condenser 38 by compressed air pump 40 via line 42 through check valve 44 and valve 46 to facilitate condensation within condenser 38 by increasing the pressure therein. Any other suitable expedient may be employed to facilitate condensation of the vapor within condenser 38, as by equipping the exterior of condenser 38 with cooling fins (not shown), using a condensation coil driven by the vehicle air conditioning system; using a fan to provide air-cooling, etc.

Condenser 38 is equipped with a pressure regulator P and a vent valve 37. When the pressure in condenser 38 rises to a point at which the flow of vapor from tank 12 through vapor line 34 is inhibited, regulator P opens vent valve 37 to reduce the pressure in condenser 38. A vent line (not shown) runs from valve 37 to fuel tank 12 to return vented distillate vapors back into fuel tank 12. The pressure regulator P also controls valve 46 so that the pressure in the condenser 38 can be maintained at a preset minimal level, e.g. 5 psi, by the addition of air from air pump 40.

It will be apparent that distillate fuel Fd will thus accumulate within the storage container 38b of condenser 38 when heated fluid passes through heating coil 60a, or that the system may be "primed" by providing an appropriate quantity of a light distillate fuel Fd in the storage container 38b. In any case, upon the starting of the engine, if distillate fuel level sensor 39 indicates the presence of an adequate supply of liquid distillate fuel, sending unit D emits a signal via signal control line 39a to valve 26 to close off the flow of liquid fuel from fuel tank 12 to fuel pump 28 and emits a signal via signal control line 39c to open valve 56 to the flow of distillate fuel from storage container 38b via line 54 and 54a to valve 26 as long as there is an adequate supply of liquid distillate fuel in storage container 38b. The distillate fuel then flows to the engine through the liquid fuel transfer means, i.e., through fuel line 24, pump 28, fuel line 24a, valve 59, and through catalyst bed 30 or by-pass 50 to fuel line 24b, into carburetor 18, wherein it is mixed with air introduced via air inlet 18a to provide a start-up fuel/air combustion mixture for engine start-up. If there is not an adequate supply of liquid distillate fuel in storage container 38b, fuel is drawn from tank 12 as described below. Heating means may be provided to heat catalyst bed 30 to improve its conversion performance, e.g., a side stream of hot exhaust gases may be drawn directly from the engine exhaust gas manifold and passed through line 32, coil 32a and line 32b, to heat catalyst bed 30, or a heating coil powered through the vehicle's electrical system may be used to heat catalyst bed 30.

The period of time during which engine 16 is supplied with the distillate fuel Fd from storage container 38b may be determined by timer 68 which sends a signal via timer signal line 68a to solenoid-operated valve 26. The timer signal may allow valve 26 to open for the flow of liquid distillate fuel according to signals received from sending unit D for a predetermined period of time after engine start-up, for example, two minutes, after which time the engine can be expected to combust the liquid hydrocarbon fuel more efficiently. Alternatively, a temperature sensor (not shown) may be used to hold valves 26 and 56 in position to supply distillate fuel Fd to engine 16 (subject to the availability of such fuel as indicated by sending unit D) until the engine attains a predetermined operating temperature which may be indicated by the temperature of the engine exhaust gas manifold. In yet another alternative, or in addition, temperature sensors may sense the temperature of the exhaust gas fed to the catalytic converter 22 or the temperature of the catalytic converter 22 itself, and use such temperature to determine the period for which valve 26 allows distillate fuel Fd to be fed to engine 16. During this initial period of operation, e.g., about the first two minutes of operation, the engine is thus supplied with a light distillate fuel Fd which has been cracked by treatment in catalyst bed 30 to provide a fuel which is rapidly ignitable and which may be efficiently combusted in a lean fuel/air mixture. These factors greatly reduce the amount of hydrocarbon pollutants emitted in the exhaust gas during the initial period of engine operation. This is of great benefit because during this initial period the catalytic converter 22 is cold, i.e., it has not yet attained its normal operating temperature range, and is therefore much less efficient in catalyzing the oxidation of hydrocarbons and carbon monoxide than it is when it has been heated to a temperature within its normal operating range, e.g., from about 300° to 800° C. Thus, hydrocarbon emissions are significantly reduced during the critical initial cold-start period despite the inactivity of the catalytic converter.

After the predetermined time has lapsed, or the predetermined engine exhaust gas or pollution abatement catalyst temperature has been attained, timer 68 or another appropriate control mechanism switches valve 26 to stop the flow of distillate fuel Fd from storage container 38b and to begin the flow of the liquid hydrocarbon fuel, e.g., gasoline, from fuel tank 12 to engine 16 via the liquid fuel transfer means described above. Engine 16 is thus supplied with the gasoline or other liquid hydrocarbon fuel stored in fuel tank 12 for a subsequent engine operating period following the initial engine operating period. The gasoline or other liquid fuel remaining in fuel tank 12 may be considered enriched in octane depending on the amount of fuel of low boiling point fraction which has been removed therefrom. Preferably, the subsequent engine operating period begins after the catalytic converter has been heated to within its normal operating temperature range.

As discussed above, should the level of distillate fuel Fd contained in storage container 38b drop to a predetermined level deemed to be inadequate, distillate fuel level sensor 39 sends a signal via control line 39a to valve 26 which pre-empts timer 68 (or a temperature sensor or other control device, as discussed above) and switches the valve to supply the engine 16 with fuel from fuel tank 12. However, storage container 38b will be sized to hold a quantity of distillate fuel projected to be adequate to start the engine until normal engine operation replenishes the supply by vaporizing the liquid hydrocarbon fuel in tank 12. The light distillate fuel will thus be continuously replenished by vapor evaporated from the fuel in tank 12 as described above. Therefore, an ample supply of distillate fuel Fd should be available at all times for any reasonable duration of the initial operating periods.

Regeneration of cracking catalyst bed 30 will be required from time to time. Generally, regeneration may be achieved by providing sufficient oxygen in the gas flowed through catalyst bed 30 at a sufficiently high temperature, to oxidize carbonaceous deposits which tend to accumulate on the cracking catalyst during use. Heating coil 32a supplies heat during regeneration in the same manner as it does during cracking operation, as described above. Therefore, it is preferred to regenerate catalyst bed 30 when the exhaust gases are hot, i.e., after the initial cold-start period of operation and while the engine is running on liquid hydrocarbon fuel from fuel tank 12. During regeneration, the flow fuel by-passes catalyst bed 30 via by-pass line 50 as described below. Regeneration is initiated by a regeneration signal from a regeneration control means (not shown) at timed intervals or when a sensor indicates that the catalyst in bed 30 is not operating effectively. Preferably, regeneration is performed during extended periods of operation and for this reason, the regeneration control means may comprise a mechanism controlled by the vehicle operator at appropriate times. Upon receipt of the initiation signal, valve 59 closes off the flow of fuel through catalyst bed 30 and directs the fuel through by-pass line 50, and then to the engine via line 24b as before. In addition, valve 46 admits compressed air from compressed air pump 40 and line 42 into line 48 for introduction into fuel line 24a, in order to pass combustion air through catalyst bed 30 to oxidize carbonaceous deposits accumulated on the cracking catalyst contained therein, and thereby regenerate the catalyst.

During regeneration, solenoid-operated valve 70 is positioned to isolate the effluent of catalyst bed 30 from carburetor 18 and to admit the discharged regeneration products emerging from catalyst bed 30 via line 72 into exhaust pipe 20 at a point upstream of catalytic converter 22 so that the regeneration by-products are treated in catalytic converter 22.

Generally, it will be observed that the embodiment of the invention illustrated in FIG. 1 provides for continuous replenishment of the distillate fuel Fd by vaporization of the gasoline or other hydrocarbon liquid fuel contained in fuel tank 12 and condensation of light distillate fuel therefrom within condenser 38. This light distillate fuel is utilized during an initial cold-start engine operating period to thereby reduce the emission of hydrocarbon pollutants at least until the catalytic converter 22 has reached its normal operating temperature and thereby its usual operating efficiency. The light distillate fuel Fd may be further enhanced by being cracked/isomerized by being passed through the cracking catalyst contained in catalyst bed 30. After a predetermined period of initial engine operation, controlled either by a timer or by sensing the temperature of the engine or the exhaust or the catalytic converter (22 in the illustrated embodiment) temperature, the fuel supply is switched to the conventional gasoline or other liquid hydrocarbon fuel contained in fuel tank 12. This fuel is passed through the cracking catalyst bed (30 in the illustrated embodiment) to provide a cleaner burning fuel for the subsequent engine period of operation.

While the invention has been described in detail with respect to specific preferred embodiments thereof, it will be appreciated upon a reading and understanding of the foregoing that numerous variations may be made to those embodiments which nonetheless lie within the spirit and scope of the appended claims.

What is claimed is:

1. A method for abating pollutants in the exhaust gas discharged from an internal combustion engine fueled by a liquid hydrocarbon fuel, the method comprising:
   (a) heating the liquid hydrocarbon fuel to vaporize therefrom a low boiling point fraction, condensing the low boiling point fraction to obtain therefrom a distillate fuel, and storing the distillate fuel in a storage container;
   (b) supplying the distillate fuel to the engine as part of a start-up fuel/air combustion mixture for engine start-up and during an initial engine operating period;
   (c) after the initial engine operating period, terminating the supply of distillate fuel to the engine and supplying the liquid hydrocarbon fuel of (a) to the engine as part of a second fuel/air combustion mixture for a subsequent engine operating period;
   (d) refining at least one of the distillate fuel and the liquid hydrocarbon fuel by contacting it under cracking or isomerizing conditions with a cracking catalyst prior to supplying the fuel to the engine; and
   (e) regenerating the cracking catalyst during operation of the engine by by-passing the supply of distillate fuel or liquid hydrocarbon fuel to the engine around the cracking catalyst, and flowing air through the cracking catalyst under catalyst regeneration conditions.

2. The method of claim 1 wherein at least one of refining of step (d) and regenerating of step (e) comprises heating the cracking catalyst.

3. The method of claim 2 wherein heating the cracking catalyst comprises using heat generated by operation of the engine.

4. The method of claim 2 wherein heating the cracking catalyst comprises using electrical power.

5. The method of claim 1 including carrying out step (a) by heating the liquid hydrocarbon fuel with heat generated by operation of the engine.

6. The method of claim 3 or claim 5 wherein using heat generated by operation of the engine comprises taking heat from the engine exhaust gas.

7. The method of claim 3 or claim 5 wherein using heat generated by operation of the engine comprises taking heat from the engine coolant fluid.

8. The method of claim 1 wherein condensing the low boiling point fraction in step (a) comprises passing the low boiling point fraction in heat exchange relation with a heat exchanger utilizing coolant from an air conditioning system powered by the vehicle engine.

9. The method of claim 6 further comprising treating the exhaust gas discharged by the engine to abate the pollutants content of the exhaust gas by contacting the exhaust gas under abatement conditions with an exhaust gas purification catalyst before using the exhaust gas to heat the liquid hydrocarbon fuel.

10. The method of claim 1 further comprising measuring the temperature of the liquid hydrocarbon fuel and ceasing the supply of heat thereto when the temperature reaches a predetermined level.

11. The method of claim 1 wherein condensing the low boiling point fraction in step (a) comprises increasing the pressure in the storage container.

12. The method of claim 1 or claim 10 further comprising measuring the quantity of the liquid hydrocarbon fuel and ceasing the supply of heat thereto when the quantity falls to a predetermined level.

13. In an internal combustion engine apparatus comprising an internal combustion engine having a fuel intake, a fuel tank for storing a liquid hydrocarbon fuel and a liquid fuel transfer means including a fuel pump and a fuel line connecting the fuel tank in liquid flow communication with the engine for transferring the liquid fuel from the fuel tank to the engine, and an exhaust gas discharge pipe connected to the engine for discharge of exhaust gas from the engine, the improvement comprising:
   (a) liquid fuel heating means disposed within the fuel tank to vaporize a low boiling point fraction from the liquid hydrocarbon fuel;
   (b) a vapor line connecting the fuel tank in vapor flow communication with a condenser zone for condensing the low boiling point fraction into a liquid distillate fuel;
   (c) a distillate fuel storage container connected in flow communication with the condenser zone;
   (d) a distillate fuel line connecting the distillate fuel storage container in liquid flow communication with the fuel line and having a distillate fuel control valve disposed therein to selectively control the flow of distillate fuel thereto;
   (e) a liquid fuel control valve disposed in the fuel line to selectively control the flow of fuel from the fuel tank or the distillate fuel line through the fuel line;
   (f) control means responsive to start-up of the engine and operatively connected to the liquid fuel control valve and to the distillate fuel control valve to open the distillate fuel control valve and operate the liquid fuel control valve to permit the flow of liquid distillate fuel into the fuel line during an initial engine operating period and to close the distillate fuel valve and operate the liquid fuel control valve to permit the flow of liquid hydrocarbon fuel through the fuel line at the end of the initial engine operating period;
   (g) a cracking catalyst bed disposed in the fuel line for converting fuel flowing therethrough into a more efficiently combustible composition; and
   (h) regeneration means for regenerating the cracking catalyst while the engine is in operation.

14. The apparatus of claim 13 further comprising fuel by-pass means disposed in the fuel line through which fuel flowed to the engine intake through the fuel line by-passes the cracking catalyst bed.

15. The apparatus of claim 13 further comprising an exhaust gas catalytic converter positioned in the exhaust gas discharge pipe in gas flow communication with exhaust gas discharged therethrough to catalyze the conversion of noxious components of the exhaust gas to innocuous components, and wherein the liquid fuel heating means is dimensioned and configured to transfer heat from the effluent of the exhaust gas catalytic converter to the liquid hydrocarbon fuel in the fuel tank.

16. The apparatus of claim 13 or claim 15 further comprising fuel tank temperature sensing means and wherein the liquid fuel heating means is responsive to the temperature sensing means, wherein when the temperature of the liquid hydrocarbon fuel reaches a predetermined level, the liquid fuel heating means stops heating the fuel tank.

17. The apparatus of claim 13 or claim 15 further comprising fuel tank level sensing means and wherein the liquid fuel heating means is responsive to the level sensing means, wherein when the level of the liquid hydrocarbon fuel falls to a predetermined level, the liquid fuel heating means stops heating the fuel tank.

* * * * *